United States Defensive Publication [19] (H) [11] T969,009

Lahut et al. [43] Apr. 4, 1978

[54] TRANSFER OF MAGNETIC TONER PARTICLES WITH A DIRECTED MAGNETIC FIELD

[75] Inventors: Joseph A. Lahut; Raymond E. Skoda, both of Scotia, N.Y.

[73] Assignee: General Electric Company, New York, N.Y.

[21] Appl. No.: 788,292

[22] Filed: Apr. 18, 1977

Related U.S. Application Data

[63] Continuation of Ser. No. 579,678, May 21, 1975, abandoned.

[51] Int. Cl.[2] ..... G03G 19/00

[52] U.S. Cl. ..... 346/74.1; 118/644

[57] ABSTRACT

Magnetic toner images are transferred from a latent magnetic image on a magnetic recording surface to hard copy medium, which may be paper, by (1) disposing the hard copy medium in contact with a toner image; and (2) applying a transfer magnetic field in the region of contact. The transfer magnetic field is directed tangential to the recording surface and has a gradient directed from the recording surface to the copy medium. The intensity of the magnetic transfer field may be greater or less than the intensity which is necessary to erase the latent magnetic image in the magnetic recording surface.

1 Claim, 1 Sheet Drawing,

14 Pages Specification

The file of this unexamined application may be inspected and copies thereof may be purchased (849 O.G. 1221, Apr. 9, 1968).

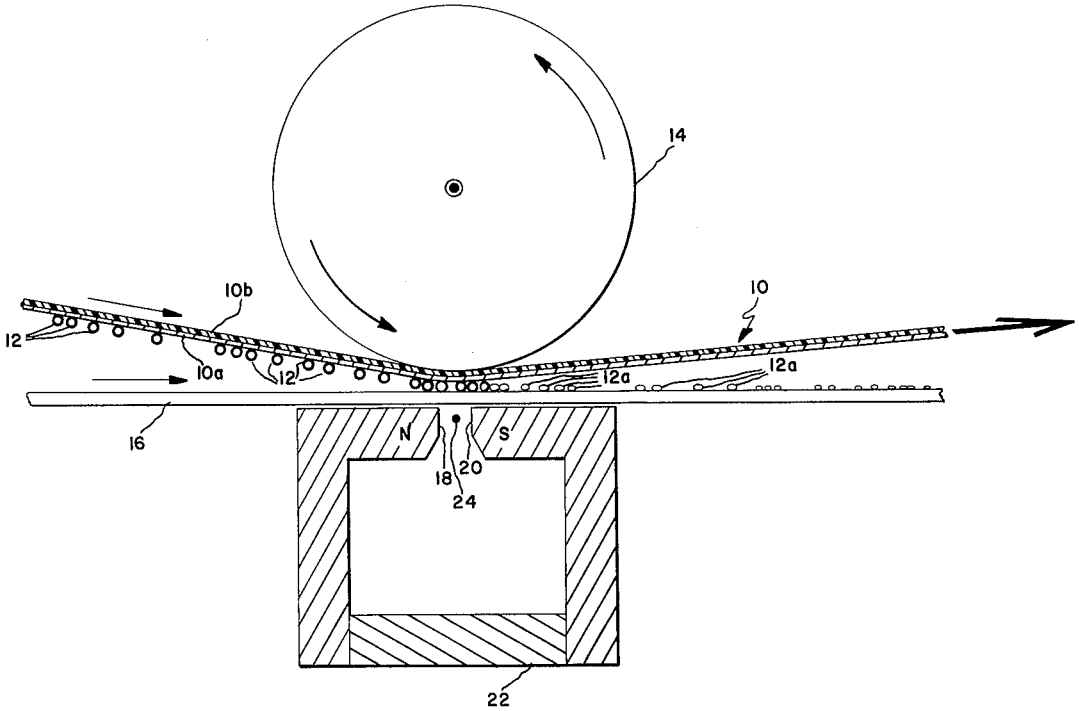

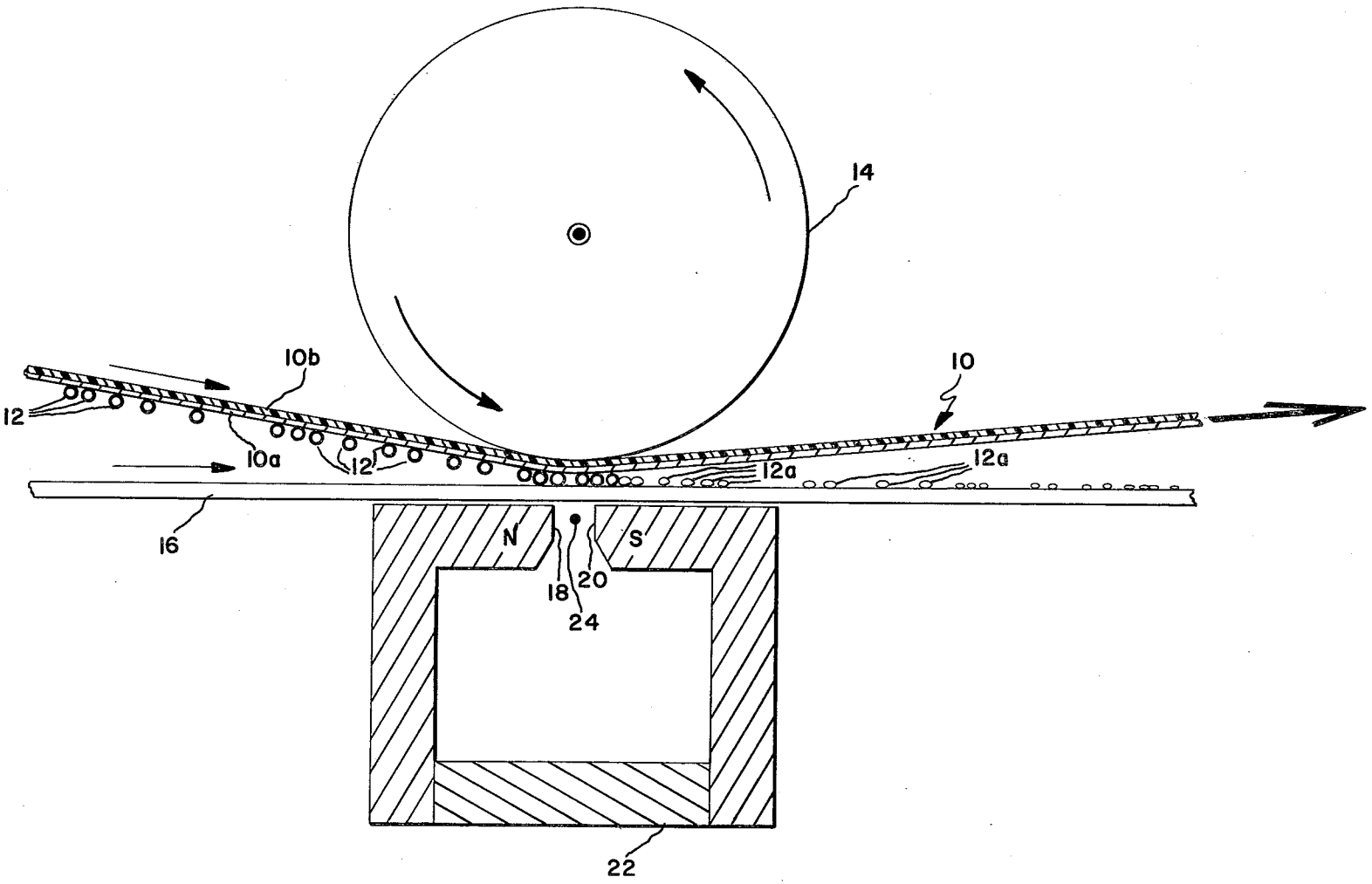
10
12a
12a
14
S
N
20
24
18
22
12
10b
10a
16
12